Aug. 30, 1932.    T. P. WRIGHT    1,874,685
RIBLESS WING
Filed May 23, 1930
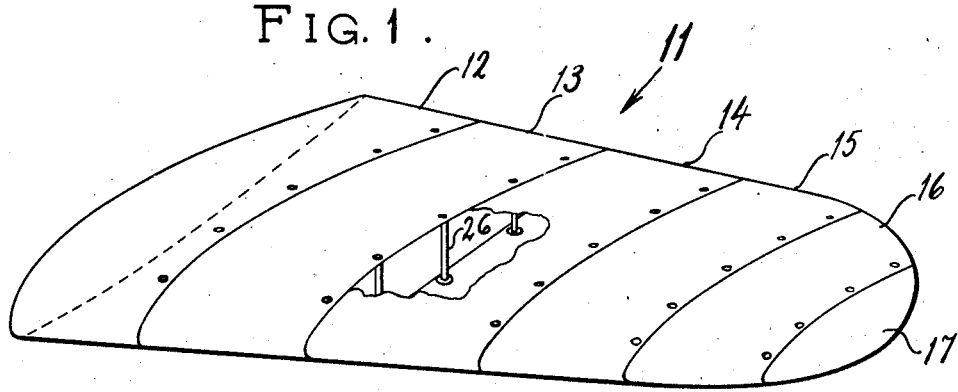
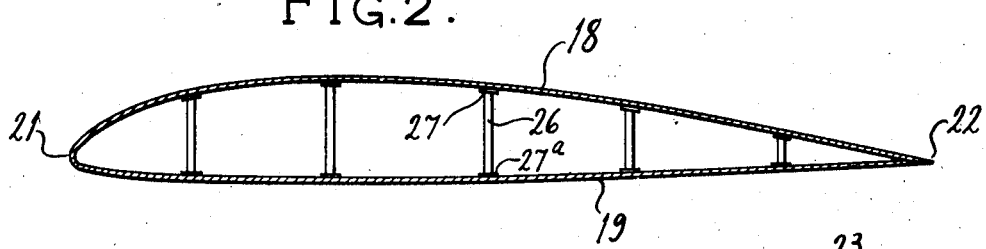
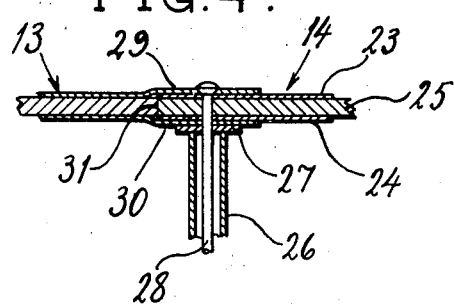
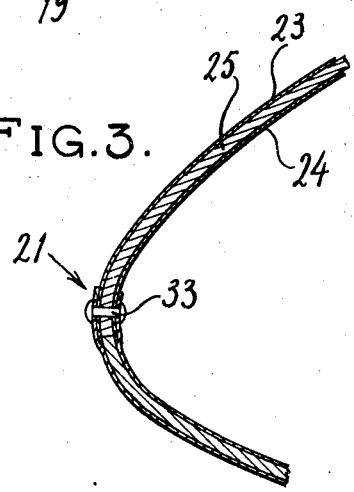
INVENTOR
THEODORE P. WRIGHT
BY
ATTORNEY Patented Aug. 30, 1932

1,874,685

UNITED STATES PATENT OFFICE

THEODORE P. WRIGHT, OF PORT WASHINGTON, NEW YORK, ASSIGNOR TO CURTISS AEROPLANE & MOTOR COMPANY, INC., A CORPORATION OF NEW YORK

RIBLESS WING

Application filed May 23, 1930. Serial No. 454,966.

This invention relates in general to ply material construction. In particular, the construction described is especially fitted for use in airplane wings.

An airplane wing structure may be said to have four functions: (a) the skin function, normally fulfilled by fabric; (b) the contour function, normally fulfilled by ribs; (c) the shear function, normally fulfilled by the drag truss; and (d) the lift truss function, normally fulfilled by the wing beams in their ability to take bending and end loads. In the conventional wing these four functions are performed by four separate structures, and this use of four separate structures has worked out fairly satisfactorily on conventional untapered wings. Difficulty, however, arises when applying the conventional type of structure to tapered wings of the internally braced type.

A type of wing construction has been proposed in which the skin function and the contour function are both performed by the skin. In said proposed construction, the skin is made of corrugated metal with the corrugations extending in the direction of travel of the airplane. In such construction, however, the skin does not assist in taking either the shear or the bending loads.

Another type of metal construction has been proposed in which a sheet dural box is formed within the wing and covered with metal sheets so that the dural box takes care of both the bending and the shear functions. This structure does not, however, perform either the covering or the contour function.

There has also been proposed a type of construction in which the skin is formed entirely of wood so that it carries the shear loads and at the same time forms the covering. This construction, however, is such that the skin does not take all of the bending loads and does not perform the contour function, it being necessary to provide former ribs to hold the covering in shape and it also being necessary to provide beams which assist in taking the bending loads.

One of the objects of my invention is to provide a structure for airplane wings in which the skin is utilized for performing all four of the functions mentioned above. It is thus possible to secure the great advantage of performing many functions with one member so that the weight may be kept as small as possible.

A further object of my invention is to provide a structure which is practically rigid in torsion and therefore eminently suited for use in an internally braced monoplane.

A further object is the provision of a skin cover which, in addition to the above features, gives adequate protection against the elements and which is practically safe against punctures.

A further object is to provide a type of construction which will be cheap to fabricate and which contains in combination the features of strength, smooth surface, and light weight.

A further object of the invention is to provide a light weight type of construction suitable for airplane wings utilizing only such materials as may be expected to be available at all times even in case of a national emergency.

Further objects will be apparent from a reading of the subjoined specification and claims and from a consideration of the accompanying drawing.

My improved type of construction contemplates the use of a built up ply material fabricated initially in the proper contour. The upper and lower surfaces or skins of each section of the wing comprise three ply plates which are each separately constructed.

Each plate is, as stated above, of three ply construction and has a duralumin or other metal sheet secured to each face of a relatively thick sheet of some light filler material such as balsa wood, rubber composition, or fiber board. An upper skin or plate and a lower skin or plate having been initially fabricated on forms to the exact contours desired, they are then connected with each other at the leading and trailing edges to form a section of a wing. All of the sections of the wing thus formed are next joined to each other, side by side, until the desired span is obtained and at the same time sufficient frame work is interposed between the upper and lower plates for spacing them. The framework interposed is very light, its only function being to space the plates and the weight of said frame work is almost negligible as compared with the weight of conventional ribs.

In order to explain the invention more clearly, one embodiment thereof is shown in the accompanying drawing, in which:

Fig. 1 is a perspective view of a wing constructed according to my invention;

Fig. 2 is a sectional view of the wing shown in Fig. 1;

Fig. 3 is a sectional view on an enlarged scale of the nose of the wing shown in Figs. 1 and 2; and Fig. 4 is a sectional view on an enlarged scale of a joint by which two sections of the wing are joined to each other and of part of one of the spacer elements by which the upper and lower skins are held apart.

Referring specifically to the drawing in which like numerals are used to indicate the same or similar parts, I have shown a wing 11 formed in sections 12, 13, 14, 15, 16 and 17. Each of these sections is formed of an upper skin or plate 18 and a lower skin or plate 19 joined to each other as at 21 and 22.

Both the upper and lower plates are formed of a ply material, the construction of which is shown more in detail in Figs. 3 and 4. This ply material includes an upper and lower sheet of metal such as the upper sheet 23 of duralumin and the lower sheet 24 also of duralumin. Interposed between the upper and lower sheets 23 and 24 is a relatively thick sheet of filler material of non-metallic composition such as the sheet 25. This built up ply material is fabricated initially in its proper contour for the desired wing surface and is later assembled into wing form as is described hereinafter.

The upper and lower skins or plates for the wing are separated from each other by spacer elements which may comprise tubes, such as the tube 26, interposed between said upper and lower plates. These tubes may be provided with washers, such as the washers 27 and 27ª, for bearing on the plates and with tie rods, such as the rods 28, which serve as tension members for holding the upper and lower plates together and for maintaining the tubes 26 in position. The metallic upper sheet of one section is lapped over the metallic upper sheet of the other section as shown at 29 in Fig. 4 and the metallic lower sheet of one section is lapped over the metallic lower sheet of the other section as shown at 30 in Fig. 4. The filler plates 25 are not lapped but form a butt joint at a point 31 spaced from the tie rods 28. The tie rods pass through aligned holes bored in all four of the lapped metal sheets and through an aligned hole bored in one of the filler sheets. They also pass through the spacer tubes and their cooperating washers, and through the corresponding slots of the lower plate.

The upper and lower plates are joined to each other at their forward end as is shown in detail at 21 in Fig. 3. One of the upper sheets 23 is lapped over the other upper sheet and one of the lower sheets 24 is lapped over the other lower sheet while the filler sheets 25 are not lapped, being butt-jointed instead. A rivet 33 is fastened through the lapped upper and lower sheets and through one of the filler sheets so as hold the ply metal construction in a firm joint. The rear ends may be similarly joined or, if desired, the overlapping rear edges may be riveted in the conventional manner.

It is thought that the construction of an airplane wing according to the above described invention will be readily understood by those skilled in the art from the description and drawing. A non-metallic substance such as wood or fiber board is formed initially in a relatively thick sheet of the desired contour, of a length sufficient to extend from the nose of the wing to the rear part thereof, of any convenient width, and having a suitable thickness such as about ⅛ of an inch. Cooperating duralumin sheets for the top and bottom of the non-metallic sheet are formed of substantially the same contour, length, and width and of suitable thickness which may be of the order of .015 of an inch. The metal sheets are secured to the non-metallic sheet on each side thereof by any suitable means such as by gluing, and thereafter each section is separately assembled by riveting an upper and a lower three ply plate together at the nose and at the trailing edge. Thereafter the separate sections are joined to each other by means of the tie rods such as 28, the tubes and washers being inserted in the same operation for spacing the upper and lower plates of the wing.

It is to be understood that the above described embodiment of the invention is for the purpose of illustration only and various changes may be made therein without departing from the spirit and scope of the invention.

I claim as my invention:

1. A beamless wing for airplane structures comprising top and bottom cover plates of ply material, the outer sheets of said ply being of metal and an inner sheet of said ply being of fibrous material; said cover plates being of such thickness and strength as to sustain unaided substantially the full bending, lift and drag stresses expected to be encountered in actual use, and said cover plates being held in spaced relation by a multiplicity of independent and disjointed tie rod and compression members extending from one to the other of said plates.

2. A beamless and ribless wing for airplane structures comprising an upper skin for said wing, a lower skin for said wing, a plurality of rows of spacer elements interposed between said upper skin and said lower skin, each of said rows containing a plurality of separate spacer elements, and each of the spacer elements being wholly unconnected with any other spacer element in the same row or in any other row except through said skins.

3. A beamless and ribless wing for airplane structures comprising a top cover plate of ply material, a bottom cover plate of ply material, and a plurality of spacer elements interposed between said top and bottom cover plates, said spacer elements being arranged in a plurality of rows, and each of said rows comprising a plurality of spacer elements, and said spacer elements being wholly unconnected with each other except through said cover plates.

4. In a wing for an airplane, a plurality of plates each comprising a three ply material of which the middle ply is thick relative to the upper and lower plys, said plates being joined to each other by lapped joints in which the inner ply of one plate abuts against the inner ply of another plate and in which the outer plys of one of said plates overlap the outer plys of another plate.

5. A wing for an airplane comprising; a plurality of sections, each formed of an upper and a lower surface and each surface composed of a ply material having an inner ply of a light non-metallic substance and having outer plys of metal positioned on each side of the inner ply; spacer elements for holding the upper and lower surfaces of the wing apart; and tension elements for holding the upper and lower surfaces of the wing together.

6. A wing for an airplane comprising; a plurality of sections, each of said sections being formed of an upper and a lower surface, each surface being composed of a ply material having an inner relatively soft filler and having outer relatively hard coverings, the sections being joined to each other by lapped joints in which the inner soft filler material of one section abuts against the inner soft filler material of the other section and in which the hard outer cover of the ply material of one section laps over the hard outer cover material of the other section.

7. An airplane wing having an upper and a lower plate of ply material comprising an inner filler member of non-metallic structure, and a pair of outer sheets of metal positioned one on each side of the inner sheet, one of said plates having its outer sheets extending beyond its inner filler member and adapted to receive between said extended portions the adjacent end of the other plate.

8. An airplane wing comprising a plurality of sections, each section including an upper and a lower plate of ply material consisting of an inner filler member of fibrous material and a pair of relatively thin outer sheets of metal secured to said filler member one on each side thereof, certain of said plates having their outer sheets extending beyond their inner filler members and adapted to receive therebetween the ends of adjacent plates.

9. The combination with a beamless and ribless wing comprising an upper and lower surface, of spacing members interposed between and bearing directly against said upper and lower surfaces for spacing said surfaces, and a tension element passing through said upper and lower surfaces and through each of said members for maintaining said surfaces and members in proper relationship.

In testimony whereof I hereunto affix my signature.

THEODORE P. WRIGHT.